US006798120B1

(12) United States Patent
Fearing et al.

(10) Patent No.: US 6,798,120 B1
(45) Date of Patent: Sep. 28, 2004

(54) APPARATUS AND METHOD FOR MANIPULATION OF AN OBJECT

(75) Inventors: Ronald S. Fearing, El Cerrito, CA (US); Eiji Shimada, Kanagawa (JP)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/004,235

(22) Filed: Oct. 31, 2001

(51) Int. Cl.$^7$ .............................................. H01L 41/08
(52) U.S. Cl. ..................................... 310/331; 310/328
(58) Field of Search ......................... 310/328, 330–332

(56) References Cited

U.S. PATENT DOCUMENTS

| | | | | | |
|---|---|---|---|---|---|
| 3,146,367 | A | * | 8/1964 | McNaney | 310/331 |
| 3,304,773 | A | * | 2/1967 | Rogallo | 310/331 |
| 3,336,529 | A | * | 8/1967 | Tygart | 310/331 |
| 3,928,778 | A | * | 12/1975 | Ivanov | 310/331 |
| 4,523,120 | A | * | 6/1985 | Assard et al. | 310/331 |
| 4,622,483 | A | * | 11/1986 | Staufenberg et al. | 310/328 |
| 4,686,440 | A | * | 8/1987 | Hatamura et al. | 310/328 |
| 5,049,775 | A | * | 9/1991 | Smits | 310/328 |
| 5,696,421 | A | * | 12/1997 | Zumeris et al. | 310/328 |
| 5,705,878 | A | * | 1/1998 | Lewis et al. | 310/328 |
| 6,359,370 | B1 | * | 3/2002 | Chang | 310/328 |

OTHER PUBLICATIONS

Peter K. Allen, et al., "A System for Programming and Controlling a Multisensor Robotic Hand," *IEEE Transactions on Systems, Man, and Cybernetics*, vol. 20, No. 6, Nov./Dec. 1990, pp. 1450–1456.
Antonio Bicchi, "Hands for Dexterous Manipulation and Robust Grasping: A Difficult Road Toward Simplicity," *IEEE Transactions on Robotics and Automation*, Vo. 16, No. 6, Dec. 2000, pp. 652–662.
Randy C. Brost, "Automatic Grasp Planning in the Presence of Uncertainty," Proceedings 1986 IEEE International Conference on Robotics and Automation, vol. 3, 1986, pp. 1575–1581.
Brian Carlisle, et al., "A Pivoting Gripper for Feeding Industrial Parts," *IEEE*, 1994, pp. 1650–1655.
Alain Codourey, et al., "A Robot System for Automated Handling in Micro–World," *IEEE*, Institute of Robotics, ETH–Zurich, CLA, 8092 Zurich, 1995, pp. 185–190.
Michael Erdmann, et al., "Mechanical Parts Orienting: The Case of a Polyhedron on a Table," *Algorithmica*, vol. 10, 1993, pp. 226–247.
Ronald S. Fearing, "Simplified Grasping and Manipulation with Dextrous Robot Hands," *IEEE Journal of Robotics and Automation*, vol. RA–2, No. 4, Dec. 1986, pp. 188–195.
Ronald S. Fearing, "Survey of Sticking Effects for Micro Parts Handling," *IEEE*, Dept. of EE&CS, University of California, Berkeley, CA, 1995, pp. 212–217.
John T. Feddema, et al., "Visual Servoing and CAD–Driven Microassembly," *IEEE Robotics and Automation Magazine*, Dec. 1998, pp. 18–24.
K. Goldberg, "Orienting Polygonal Parts Without Sensors," *Algorithmica*, Special Issue on Computational Robotics, vol. 10, No. 3, pp. 201–225, Aug. 1993.
Swaminathan Gopalswamy, et al., "Grasping Polyhedral Objects with Slip," *IEEE*, 1989, pp. 296–301.
Takeshi Kasaya, et al., "Micro Object Handling Under SEM by Vision–based Automatic Control," *SPIE*, vol. 3519, Nov. 1998, pp. 181–192.

(List continued on next page.)

Primary Examiner—Mark Budd
(74) Attorney, Agent, or Firm—Beyer Weaver & Thomas, LLP.

(57) ABSTRACT

An apparatus for manipulating an object. The apparatus comprises a pair of actuated compliant beams that are mounted substantially perpendicular to each other.

26 Claims, 9 Drawing Sheets

OTHER PUBLICATIONS

Bradley J. Nelson, et al., "Sensor-Based Microassembly of Hybrid MEMS Devices," *IEEE*, Dec. 1998, pp. 35-45.

Anil Rao, et al., "Complete Algorithms for Feeding Polyhedral Parts Using Pivot Grasps," *IEEE Transactions on Robotics and Automation*, vol. 12, No. 2, Apr. 1996, pp. 331-342.

Daniela Rus, "Coordinated Manipulation of Polygonal Objects," *Proceedings of the 1993 IEEE/RSJ International Conference on Intelligent Robots and Systems*, Yokohama, Japan, Jul. 26-30, 1993, pp. 106-112.

E. Shimada, et al., "Prototyping Millirobots Using Dextrous Microassembly and Folding," *Proceedings of the ASME Dynamic Systems and Control Division*, DSC-vol. 69-2, 2000, pp. 933-940.

Metin Sitti, et al., "Two-Dimensional Fine Particle Positioning Using a Piezoresistive Cantilever as a Micro/Nano-Manipulator," *Proceedings of the 1999 IEEE International Conference on Robotics and Automation*, Detroit, Michigan, May 1999, pp. 2729-2735.

A. Sulzmann, et al., "New developments in 3D Computer Vision for Microassembly," *SPIE*, vol. 3519, Nov. 1998, pp. 36-46.

Jeff Wiegley, et al., "A complete algorithm for designing passive fences to orient parts," *Assembly Automation*, vol. 17, No. 2, 1997, pp. 129-136.

Tsuneo Yoshikawa, et al., "Object Handling by Three-Fingered Hands Using Slip Motion," *Proceedings of the 1993 IEEE/RSJ International conference on Intelligent Robots and Systems*, Yokohama, Japan, Jul. 26-30 1993, pp. 99-105.

Wolfgang Zesch, et al., "Alignment of Microparts Using Force Controlled Pushing," *SPIE*, vol. 3519, pp. 148-156.

Y. Zhou, et al., "Adhesion force modeling and measurement for micromanipulation," *SPIE*, vol. 3519, pp. 169-180.

* cited by examiner

APPARATUS AND METHOD FOR MANIPULATION OF AN OBJECT

FIELD OF THE INVENTION

The present invention relates generally to micromechanical systems, and more particularly to an apparatus and method for manipulating an object.

BACKGROUND

Microassembly provides the capability to construct three dimensional heterogenous Microsystems by joining sensors, actuators, structures, and intelligence. Such components are separately fabricated and ideally available off the shelf.

The problem of robotic microassembly has been explored using high precision actuators and vision feedback. Vision based approaches are limited by poor depth of field of high power microscopes, cluttered views, and lack determination of contact or contact forces. In addition, it is difficult to perform several distinct operations in parallel as microscopes are quite bulky and expensive (although parallel operations can be performed with rigid pallets and fixtures). Alternatively, force sensor based approaches can be local and provide exact information about contact between surfaces.

At the micro-scale level, adhesion forces of surface tension, and electrostatic and Van der Waals force dominate gravitational forces. Recent work has shown how adhesive forces can be used advantageously during microassembly tasks by controlling contact areas and surface tension, to ensure that microparts are reliably transferred to the target surface and released from a gripper.

Previous micromanipulation work has used a single probe or parallel jaw grippers to manipulate parts. The parallel jaw gripper approach follows from macro-robotics where a simple gripper is used with a six degree-of-freedom (DOF) arm to reorient and position parts. However, sub-centimeter six DOF micro-robot arms are not yet available.

SUMMARY

In one aspect, the invention features an apparatus to manipulate an object. The apparatus comprises a pair of actuated compliant beams, mounted substantially perpendicular to each other, which can grip and manipulate the object.

Various implementations of the invention may include one or more of the following features. Each compliant beam includes a piezoelectric actuator. One end of the piezoelectric actuator is attached to a proximal end of a base member. A tip member is attached to a distal end of the base member. The tip member has an inclined face configured to engage the object to be manipulated. The face of the tip member may be inclined at angle of approximately 45 degrees. A strain gauge is located at a face and back of each of the base member and the tip member. The piezoelectric actuator drives a distal end of the base member. This drive is achieved through a point contact. A tip member is joined to one end of the piezoelectric actuator. Each compliant beam includes an actuator selected from the group consisting of a thermal actuator, a motor-driven beam actuator, a polymer/thermal actuator, and a flexible circuit actuator. At least one strain gauge is provided to measure a deflection of a beam or a force applied by a beam. One of the beams is only driven along a first axis, while the other one of the beams can only be driven along a second axis that is perpendicular to the first axis. Each beam is fixed to a surface.

In another aspect, the invention is directed to an apparatus to manipulate an object comprising a first arm and a second arm. The first arm is actuated only along a first axis, while the second arm is actuated only along a second axis that is substantially perpendicular to the first axis. The first and second arms define a space therebetween in which an object can be positioned such that the first and second arms can grip and manipulate the object.

In yet another aspect, the invention is directed to a system to manipulate an object. The system comprises a first arm that is actuated only along a first axis. The system further includes a second arm that is actuated only along a second axis that is substantially perpendicular to the first axis. The first and second arms define a space therebetween in which an object can be positioned such that the first and second arms can grip and manipulate the object. The system also includes an XYZ stage on which the object can be positioned.

In still another aspect, the invention features a method of manipulating an object. The method comprises grasping one side of the object with a first arm that is actuated only along a first axis and grasping another side of the object with a second arm that is actuated only along a second axis that is substantially perpendicular to the first axis. At least one of the first and second arms is actuated to manipulate the object.

Various implementations of the invention may include one or more of the following features. The first and second arms are actuated to roll the object. The first and second arms are actuated to pick and place the object. The first and second arms are actuated to reorient the object perpendicular to a grasping wall. The first and second arms are actuated to align the object along a wall.

In yet another aspect, the invention features a method of manipulating a submillimeter-sized object. The method comprises gripping one side of the object with a first actuated compliant beam and gripping another side of the object with a second actuated compliant beam that is mounted substantially perpendicular to the first beam. The first and second beams are operated to manipulate the object.

In yet another aspect, the invention is directed a method of manipulating an object comprising grasping one side of the object with a first beam that is actuated only along a first axis, and grasping another side of the object with a second beam that is actuated only along a second axis that is perpendicular to the first axis. The object is positioned in a groove in a wall as the object is grasped by the first and second beams. The position of the wall and the first beam is controlled such that the wall and the first beam grasp the object, while the second beam is transferred to another side of the object. The position of the wall and the second beam is controlled such that the wall and the second beam grasp the object, while the first beam is transferred to yet another side of the object. The wall is moved away from the object, and the first and second beams are operated to rotate the object 90 degrees.

Various implementations of the invention may include one or more of the following features. The steps of the above-described method may be repeated to rotate the object 360 degrees.

An advantage of the invention is that it enables the use of macro-scale dextrous manipulation techniques with simple mechanisms to reorient and position parts. By using gripping forces which exceed adhesion forces, Coulomb friction is used to control part sticking and sliding. Micro-parts, as well as larger parts, can be dextrously manipulated in an open-loop fashion (no feedback) using two one DOF arms in a plane combined with an XYZ cartesian stage.

Two-finger grasps of polygons and polyhedra will automatically slide to a stable configuration if the angle between the included faces is less than twice the friction angle. Conversely, a tangential force at one finger will cause the grasped part to roll about the opposite finger. As these grasping techniques do not require feedback, and are robust to initial conditions, they are well suited to the microdomain and parallelization.

The details of one or more embodiments of the invention are set forth in the accompanying drawings and the description below. Other features, objects and advantages of the invention will be apparent from the description and drawings, and from the claims.

DESCRIPTION OF DRAWINGS

Like reference symbols and reference numbers in the various drawings indicate like elements.

DETAILED DESCRIPTION

The present invention is directed to an apparatus for manipulating an object and methods of such manipulation. The present invention will be described in terms of several representative embodiments and processes in manipulating a micro-sized object such as a sub-millimeter sized part. However, larger objects, such as sub-centimeter sized parts, can also be manipulated in accordance with the present invention, if the apparatus is scaled-up for such operation.

Figure 1:
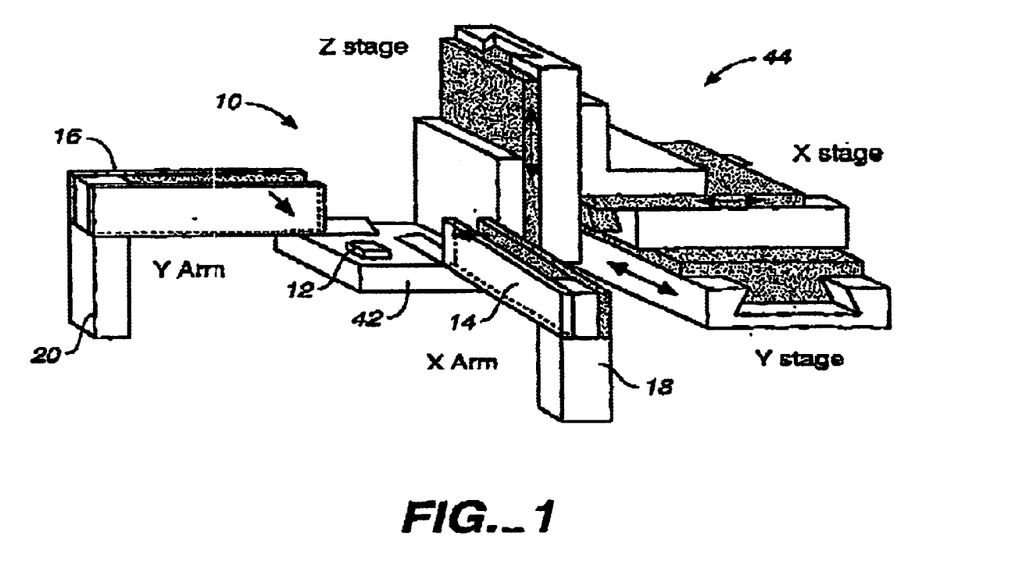
FIG. 1 is a schematic, perspective view of a system for manipulating an object including ortho-tweezers and an XYZ stage.
Figure 2:
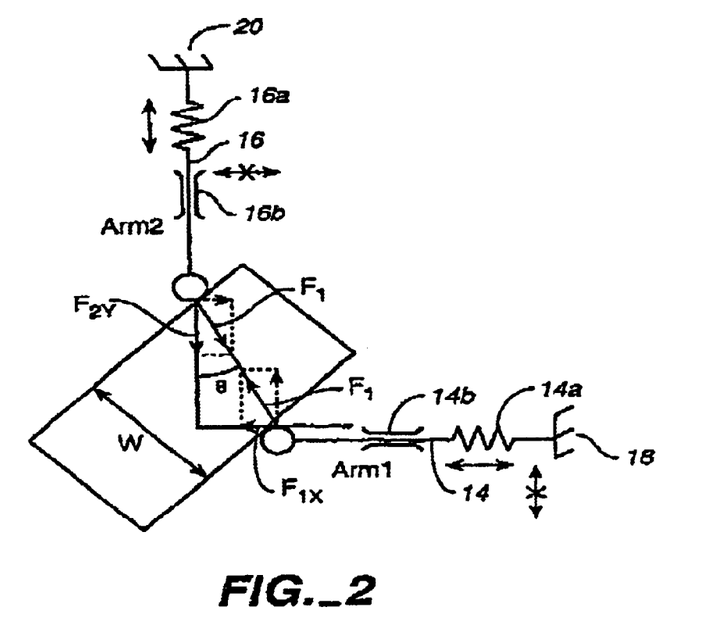
FIG. 2 is a schematic representation of a grasping configuration, showing the equivalent beam stiffness of the x- and y-arms, of an apparatus for manipulating an object.

As shown in FIGS. 1 and 2, an apparatus 10 for manipulating an object 12 includes two actuated compliant beams or arms 14 and 16 that are mounted substantially perpendicular to each other. The beams 14 and 16 are secured to a fixed surface. For example, beams 14 and 16 can be secured to fixed blocks 18 and 20, respectively, One beam is driven or actuated along a first axis, while the other beam is driven or actuated along a second axis that is substantially perpendicular to the first axis. The perpendicular configuration of the beams 14 and 16 makes it possible, for example, to rotate the object 12 by controlling the deflection of each beam separately.

As shown schematically in FIG. 2, the beam 14 is considered to be an x-arm (Arm1). It can move or translate along the x-axis as represented by a spring element 14a. However, it is prevented from moving along the y-axis as represented by a constraint element 14b. Thus, the arm or probe 14 has one DOF and moves in the +/−x-direction. The beam 16 is considered to be the y-arm (Arm2). It can move or translate along the y-axis as represented by a spring element 16a. However, it is prevented from moving along the x-axis as represented by a constraint element 16b. Thus, the arm or probe 16 also has one DOF and moves in the +/−y-direction.

Figure 3:
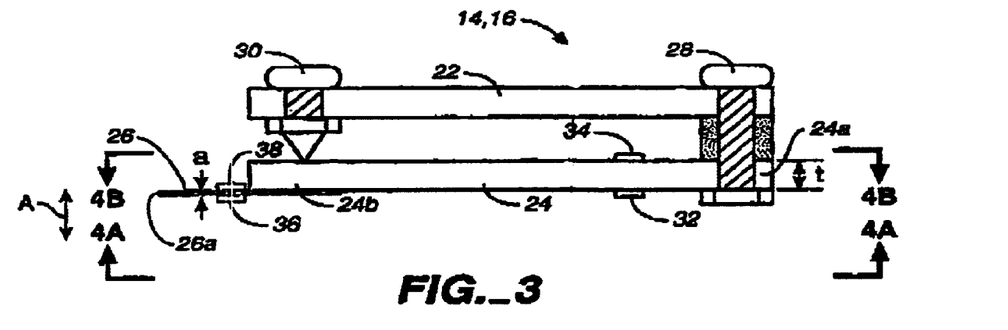
FIG. 3 is a schematic, side view of an arm of the ortho-tweezers of FIG. 1.
Figure 4A:
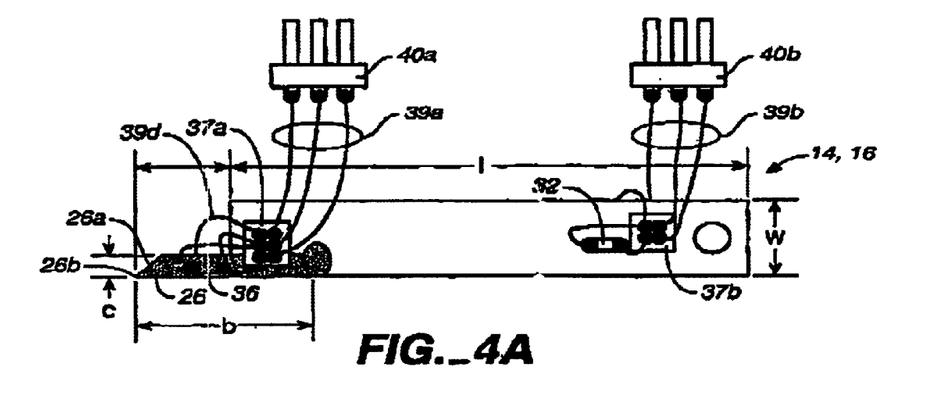
FIGS. 4A and 4B are views along lines 4A—4A and 4B—4B, respectively, of FIG. 3.
Figure 4B:
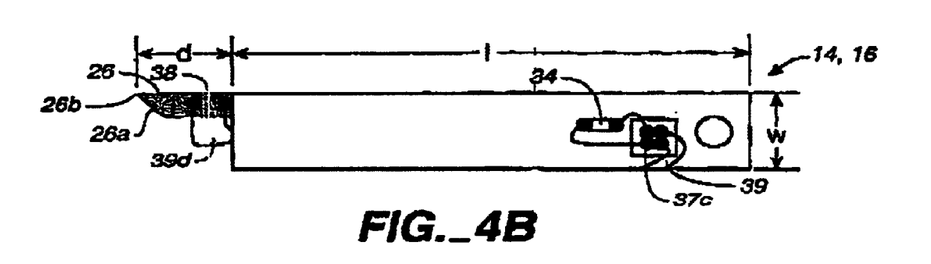

As shown in FIGS. 3, 4A and 4B, each arm or beam 14, 16 of the apparatus 10 may comprise a piezoelectric actuator 22, a base member 24 and a tip member 26. The piezoelectric actuator 22 may be a Thunder Model TH8-R (http://www.face-int.com/thunder/, Norfolk, Va.) that has dimensions of 64 millimeters (mm)×12.7 mm×0.5 mm. The base may be a stainless steel sheet that has dimensions of 0.18 mm("t")×63 mm("l")×13 mm("w"). The tip may also be made of a stainless steel. Its dimensions may be 0.05 mm("a")×10 mm("b")×2 mm("c"). The tip 26 may project a distance "d", about 6 mm, from the front end of the arm base 24.

The tip compliance can be on the order of 100 Newtons per meter (N/m). As such, a deflection of $10^{-6}$ meters corresponds to about $10^{-4}$ N or 0.1 milli-N. This small force accuracy allows a part to be "tapped" with a force of about 0.4 milli-N, without altering its position, as it sits on, for instance, a low taction Gel-Pak. (See http://www.gelpak.com, GEL-Film PF-80-X0, Sunnyvale, Calif.).

To fully grasp a part, the arms 14, 16 apply a force of about 4 milli-N. The strain gauges, discussed below, are sensitive enough to resolve a small tapping force of about 0.4 milli-N, yielding an order of magnitude difference in the forces used to sense versus manipulate.

The tip is attached to the base by, for example, an adhesive. A face 26a of the tip 26 is inclined at angle of approximately 45 degrees(°) to form a point 26b. The point 26b of the tip face 26a is that part of the beams 14, 16 that contacts the object to be manipulated. The point 26b can be formed by cutting a metal sheet, from which the tip is made, with scissors.

The piezoelectric actuator 22 and the arm base 24 are clamped together at a proximal end 24a of the arm base by, for example, a screw 28. The arm base 24 is driven with a point contact by means of, for example, a screw 30 at a distal end 24b of the arm base. The direction of movement of the tip is represented by arrows "A". The arm 14, in one embodiment, is configured such that the drive direction "A" is along the x-axis, while the arm 16 is configured such that the drive direction is along the y-axis.

Strain gauges are attached to the beams 14, 16 to measure beam deflection or a force applied by a beam. Specifically, strain gauges 32 and 34 are attached to the face and back, respectively, of the arm base 24. Another pair of strain gauges 36 and 38 are attached to the face and back, respectively, of the tip 26. The gauges on the arm base sense the overall deflection of the arm as it is driven by the piezoelectric actuator. By mounting gauges on the arm base rather than the piezo actuator, hysteresis in sensing due to actuator hysteresis is avoided. The gauges on the tip sense the gripping force with 100 micro-N accuracy. The strain gauges on the tip of the arm 14 only sense left/right forces. They do not sense forces pressing "into" the tip orthogonal to this.

The strain gauges (1 mm length×0.15 mm width) can be an Entran model ESB-020-350 (http://www.entran.com, Fairfield, N.J.). The strain gauges may be glued to their respective surfaces by the adhesive of the ES-TSKITI supply kit that is available from Entran. The electrical leads 39a, 39b, 39c, and 39d for the strain gauges are connected between soldering pads 37a, 37b, 37c and appropriate cable connectors 40a and 40b.

The arms or fingers 14, 16 may be constructed in other ways. For instance, the arm base could be eliminated and the tip could be attached directly to the piezoelectric actuator. Also, other forms of actuators may be used such as thermal actuators, motor-driven beam actuators, polymer/thermal actuators, and flexible circuit actuators.

The apparatus or ortho-tweezers 10 are fixed in space above a work platform 42 that is mounted on an XYZ stage 44 (see FIG. 1). The stage is actuated by stepping motors in the X, Y and Z directions. A component or object 12 to be manipulated is placed on the work platform 42, and the stage is operated so that the tweezers can manipulate it. As noted, the arms 14, 16 are arranged perpendicular to each other. (Note that the arm stiffness matrix can be the same as for the one DOF arm discussed in R. S. Fearing, "Simplified Grasping and Manipulation with Dextrous Robot Hands", IEEE Journal of Robotics and Automation Vol. RA-2, No. 4, December 1986, the entire disclosure of which is incorporated herein by reference. As discussed in this paper, this stiffness matrix guarantees stable grasps, without feedback, for polygons with the included angle between grasp faces less than twice the friction angle.)

Each arm 14, 16 of the apparatus 10 is pushed and bent by its respective piezoelectric actuator. The deflection of an arm is controlled by the voltage to the piezoelectric actuator. As noted, the strain gauges are used to measure the deflections and the forces at the arms. Each tip of the arms 14, 16 may have a range of motion on the order of 0.1 to 200 microns ($\mu$m).

Figure 5:
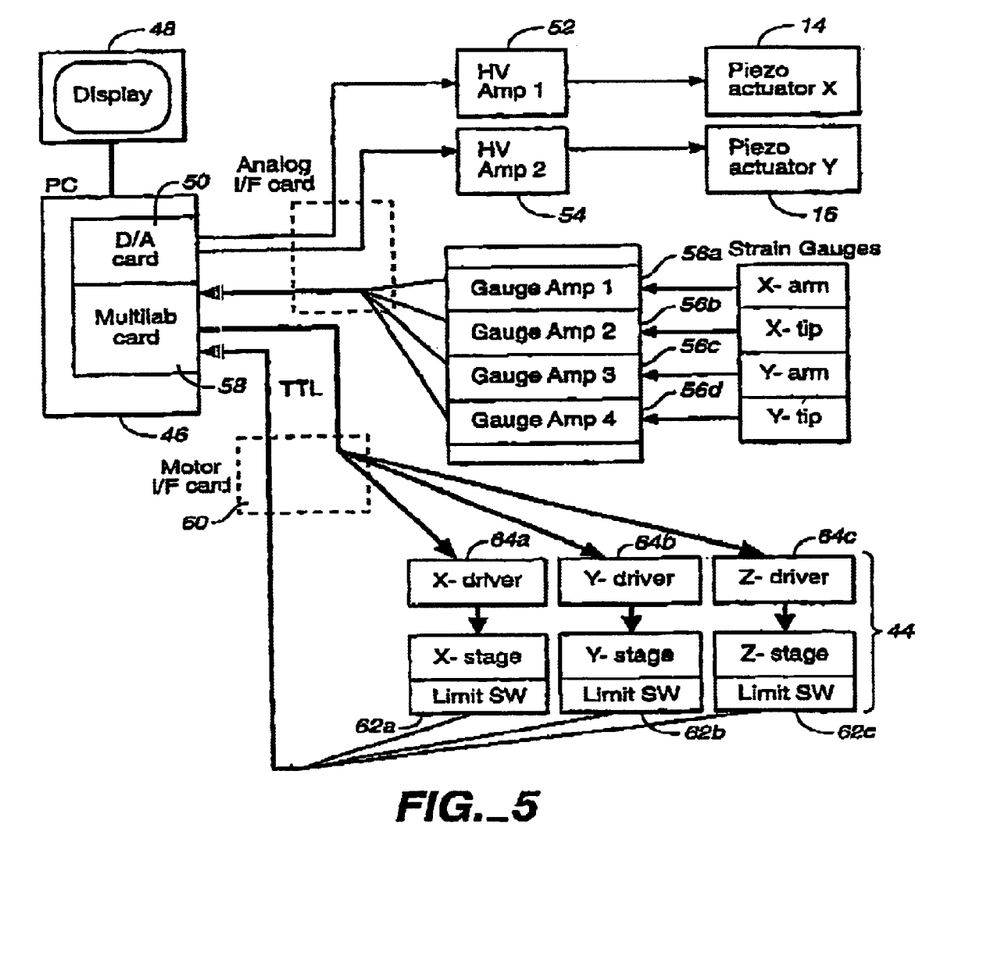
FIG. 5 is a schematic block diagram of a control system for the system illustrated in FIG. 1.

As shown in FIG. 5, a personal computer (PC) 46, for example, an Intel Pentium, controls the operation of the overall system. A display 48 is provided as part of the control system. The voltages to the piezoelectric actuators of the arms 14 and 16 are controlled by the outputs of a digital/analog (D/A) card 50. High-voltage amplifiers 52 and 54 magnify the D/A outputs approximately 40 times and apply them to the piezoelectric actuators.

The strain gauge outputs are amplified by strain gauge amplifiers 56a, 56b, 56c and 56d, and read by an Advantech Corp. Multilab card 58. The output range of the strain gauge amplifiers may be about −10~+10 volts (V), while the input range of the Multilab card may be about −5V~+5V. Since the overvoltage of the card is +/−30V maximum, the card will not be damaged by the output of the strain gauge amplifiers. The stain gauge outputs can be converted into deflection or force. The Multilab card 58 also controls the X, Y and Z stages of the stage 44 by six TTL signals.

A motor interface (I/F) card 60 provides a hardware interlock to prevent the stage from overrunning its limits. When it detects a limit input produced by limit switches 62a, 62b or 62c, it simply bans the output of a clock signal to the appropriate stage driver 64a, 64b or 64c.

Figure 6:
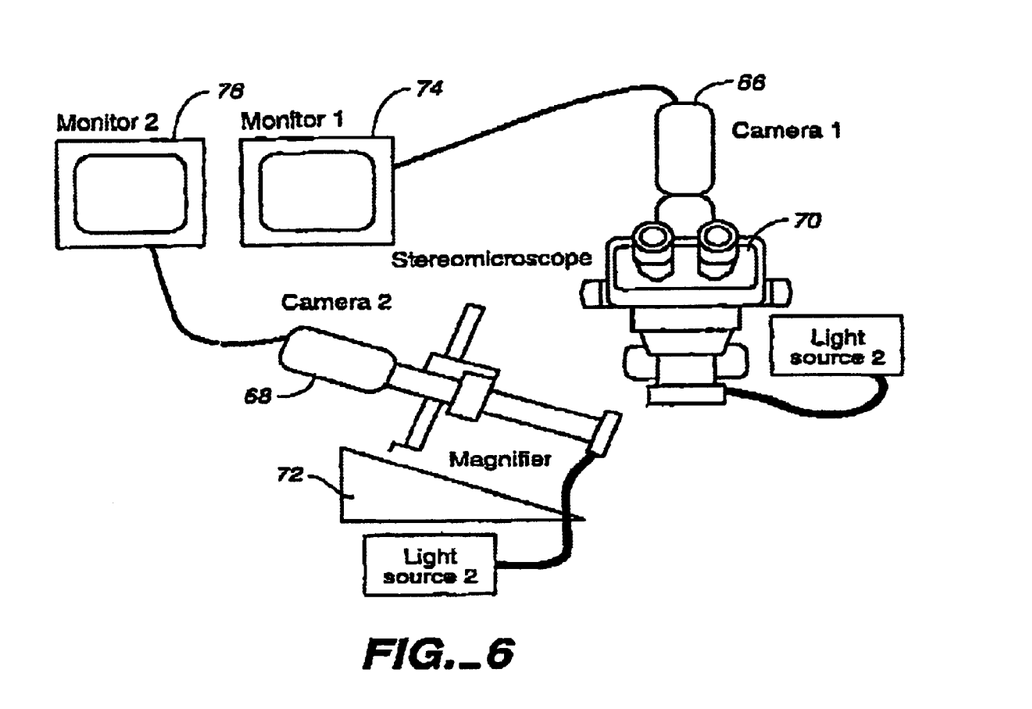
FIG. 6 is a schematic, perspective view of a monitoring system for viewing the manipulation of an object.

As shown by FIG. 6, the manipulation of an object can be observed through two color cameras 66 and 68. The camera 66 is mounted on a steromicroscope 70 and shows the top view of a manipulation. The camera 68 is attached to a 30-degree-tilted stand 72 and provides a side view. The output of cameras 66 and 68 are displayed on monitors 74 and 76, respectively.

In operation, the perpendicular configuration of the arms 14, 16 makes it possible to rotate an object (around the z-axis) by controlling the deflection of each arm separately. Referring back to FIG. 2, the tip positions of arm 14 (Arm1) and arm 16 (Arm2) are defined as ($x_1$, 0) and (0, $y_2$) respectively, and a point contact with an object is assumed. The width and orientation of the object is defined as W and $\theta$. When the ortho-tweezers grip the midpoints of opposite sides of a square object, $x_1$=W sin ($\theta$) and $y_2$=W cos ($\theta$).

Figure 7A:
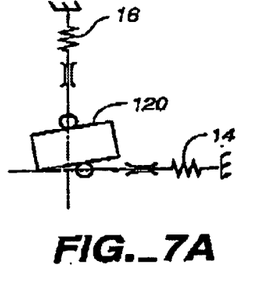
FIGS. 7A–7C are schematic views illustrating a technique for rolling an object using the apparatus of the present invention.
Figure 7B:
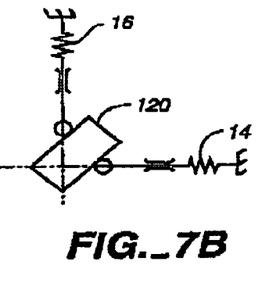
Figure 7C:
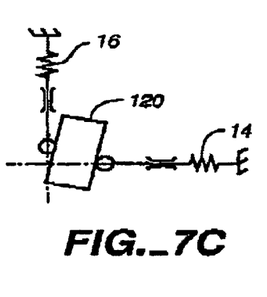

A component or object can be reoriented in a plane by controlling $x_1$ and $y_2$. As seen in FIGS. 7A–7C, the passive compliance of the arms 14, 16 ensures that a part 120 remains grasped. The voltages to the arms 14, 16 are controlled, and strain gauge outputs are measured. The piezo drive voltages for the two arms are $V_1$=V sin ($\alpha$) and $V_2$=V cos ($\alpha$), where $\alpha$ is the desired part orientation. In one experiment, a solder-coated silicon component of 200 $\mu$m×100 $\mu$m×75 $\mu$m was rolled in air, as represented by FIGS. 7A–7C. In a set of initial experiments with rotation at 10 Hz, and grasping the 75 $\mu$m by 100 $\mu$m face of the part, the part was rolled ±45° successfully in 42 out of 50 trials of 100 rotations. In the eight trials with failures, the part rotated an average of 46 (min. 12) cycles before falling out of the grip. The most likely cause of failure was the part "walking" in the grasp due to asymmetries in surface friction.

Figure 8A:
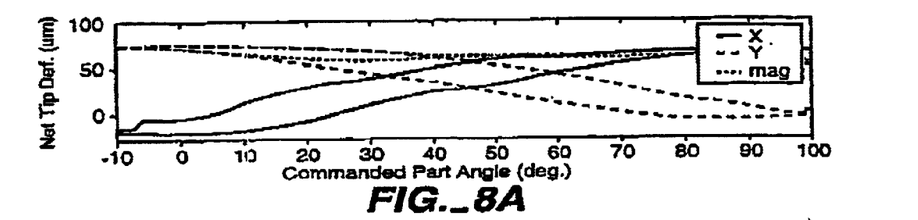
FIGS. 8A, 8B and 8C are graphical representations of net tip deflection, estimated object orientation, and sensed force components ($F_{1x}$ and $F_{2y}$) and a sensed magnitude (mag.), respectively, for the rolling of an object.
Figure 8B:
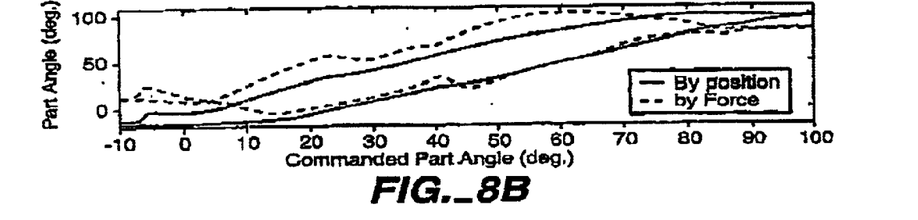
Figure 8C:
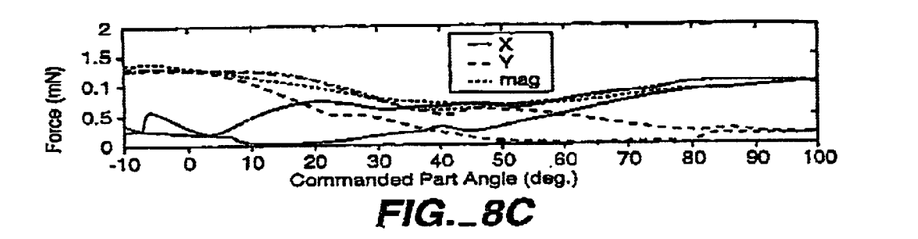

The part angle estimated from arm position measurements is $\hat{\theta}_p$=$\tan^{-1}$ $x_1/y_2$, where $x_1$ and $y_2$ are calculated from the measured strains at the base and tip of the arms 14, 16. The estimated part angle from arm force measurements is $\hat{\theta}_f$= $\tan^{-1}$ $F_{1x}/F_{2y}$, where $F_{1x}$ and $F_{2y}$ are calculated from the measured strains at the arm tips. The normalized grasping force is $\sqrt{F_{1x}^2+F_{2y}^2}$ which is kept about one mN through all the angles. As can be seen from FIGS. 8A–BC, for the 200 $\mu$m×100 $\mu$m×75 $\mu$m part, the estimated angles $\hat{\theta}_p$ and $\hat{\theta}_f$ change from 0 to 90° according to the commanded angle $\alpha$. The hysteresis on the rotation angle is jointly caused by the hysteresis of the piezoelectric actuators and the Coulomb friction dead band at the contacts. With a one mN gripping force and assuming a largest tweezer contact area of about 20 microns ($\mu$m$^2$), the contact stresses would be significantly greater than $10^6$ Nm$^{-2}$, thus dominating any dry adhesive forces.

Another experiment was conducted to confirm that the tweezers can reliably pick and place a part. A part was placed in a dent on the work platform 42 to remain within the tweezers' workspace. The dimension of the dent were approximately 400 $\mu$m(D)×200 $\mu$m(W)×30 $\mu$m(H). The command angle $\alpha$ was kept at about 45° and the voltage was decreased for grasping and increased for releasing. After each grasp, the work platform was lowered by about 120 $\mu$m in order to check whether the part was grasped in air, then raised to its original position. It took 1.24 sec to grasp (0.16 s), up-and-down(0.92 s) and release(0.16 s) the part. The tweezers grasped a 75 $\mu$m×100 $\mu$m part face with about one mN. There were no failures in 1000 cycles of pick and place.

Figure 9A:
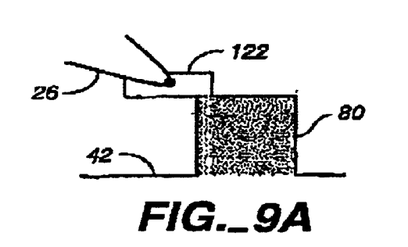
FIGS. 9A–9E schematically illustrate a technique for reorienting an object perpendicular to a grasping plane.
Figure 9B:
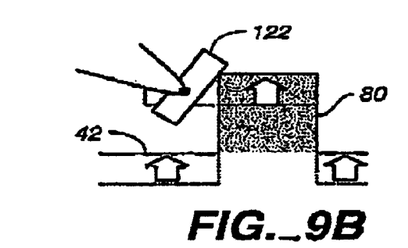
Figure 9C:
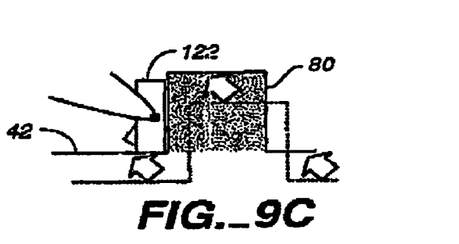
Figure 9D:
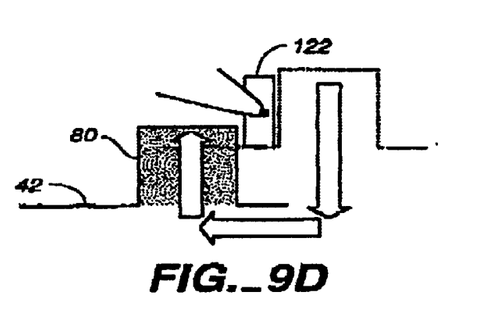
Figure 9E:
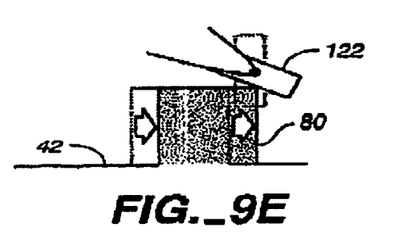

A part 122 can also be reoriented perpendicular to a grasping plane by adding a torque through contact with a fixed "finger", a wall 80 attached to the work platform 42 (see FIGS. 9A–9E). First, the tweezers grip the part and the platform is positioned such that the part is over the wall (FIG. 9A). As the platform is lifted, the edge of the wall applies a torque about the contact line between the two arms 14, 16, pivoting the part (FIG. 9B). If the friction coefficients are the same at both fingers, and the sides are parallel, for a point contact the rotation will be about a fixed axis. After being tilted, the part is pushed against the wall and made perpendicular to the platform (FIG. 9C). Then, the wall pushes the opposite edge of the part horizontally (FIG. 9D) and pivots the part to the direction parallel to the top side of the wall (FIG. 9E). In the cycle (12 sec.), the part pivots 180°. The tweezers grasped a 75 μm×100 μm face of the part at about 1.5 mN. There were no failures in 1000 cycles of 180°-pivot.

Unlike macro parts, a submillimeter-sized part strongly sticks to other objects such as the tips of manipulators. In device assembly, it is often necessary to regrasp a part for further operations such as rotation, pivot, bonding and alignment. It is possible to hold a part by vacuum, gel or another tweezer for regrasping. But it is easier to hold it without any extra devices and delicate control. A regrasping method was developed in which a part 124 was rotated more than 360° by repeating 90°-rotation.

Figure 10A:
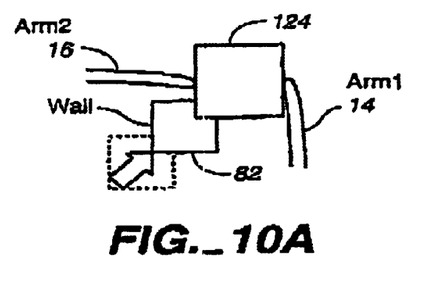
FIGS. 10A–10F schematically illustrate a technique for regrasping an object.
Figure 10B:
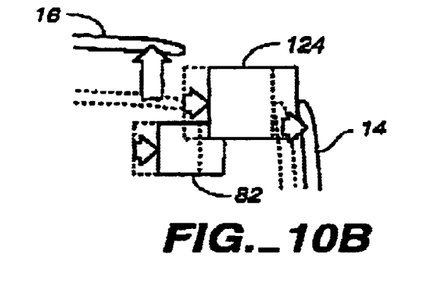
Figure 10C:
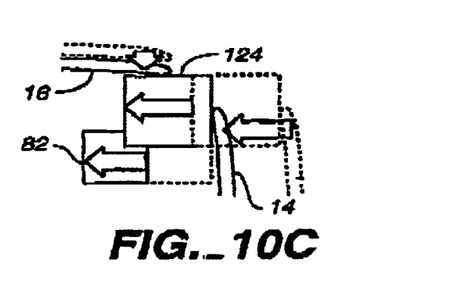
Figure 10D:
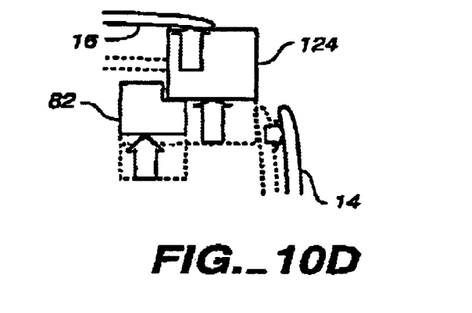
Figure 10E:
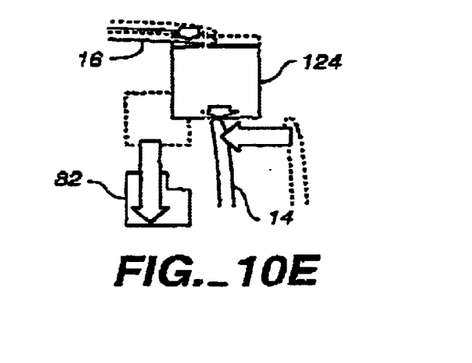
Figure 10F:
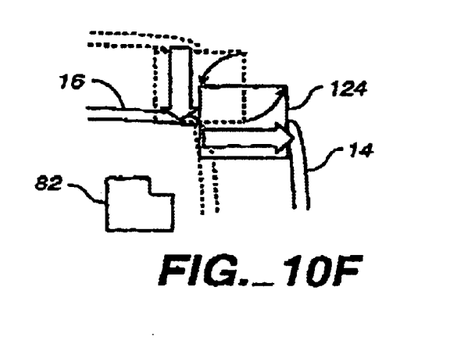

As shown in FIGS. 10A–10F, the part 124 is grasped by the tweezers 10 at α=90° and an L-shaped wall 82 fixed on the platform stage 42 is pushed against the part. While the stage and the arm 14 (Arm1) are controlled so that the wall and the arm 14 keeps gripping the part, the arm 16 (Arm2) is repositioned through coordinated motion of the XYZ stage and arms to another side of the part (FIGS. 10A–10C). Next, the arm 14 is repositioned to yet another side of the part as the wall and the arm 16 grip the part (FIGS. 10D–10E). Then, the wall is moved away from the part (FIG. 10E) and it becomes possible to rotate the part by 90° (FIG. 10F). By repeating the above-described operations, the part can be rotated 360°.

One cycle (about 10 sec.) of 90° rotation of a solder-coated silicon block of 420 μm(D)×420 μm (W)×100 μm was performed in one experiment. There were only two failures in 5000 cycles of regrasping and 90° rotation. In the two failures, the part translated in the tweezers above the edge of the wall. The wall was 125 μm(W)×100 μm(H).

Due to the lack of reliable force information, it is difficult to align a sub-millimeter part through video microscopes. Thus, parts might be broken by applying too large of a force or misaligned because of insufficient force. Consider aligning a part 126 along a plain wall 84, using the tweezers 10. The part can be simply grasped and the wall driven against the part (See FIG. 11). After the part reaches the wall, it will slide and rotate between the arms 14, 16 due to geometrical constraints and finally approximately align itself with the wall.

Although the pushing force can not be measured directly, the grasping force limits the maximum friction force between the arms 14, 16 and the part. Therefore, the maximum pushing force can be controlled by the grasping force. (The friction between the part and the platform stage is ignored, because the grasping force (≃3 mN) is far bigger than the gravity force (≃400 nN) on the part.) In order to detect part alignment, the moment around Point 4 (See FIGS. 12A–12C) was measured when a ±15° rotation command was sent. The moments around Point 4 are defined by Arm1, Arm2 and the wall as $M_1$, $M_2$ and Mw, respectively. In the static situation, $M_1+M_2+M_w=0$. Therefore, $M_w=-(M_1+M_2)=F1_{xY2}-F_{2yX1}$. If the part is not touching the wall, $M_w$ should be 0. In fact, $M_w$ was ≃0 when the part is not touching the wall. $M_w$ changes in positive and negative range according to the commanded part angle, when the part is well aligned. If $M_w$ has a level area around 0, it indicates that the part is not touching the wall in the area of the commanded part angle. Otherwise, it means that the part is well aligned. The hysteresis of $M_w$ is caused by the hysteresis of the piezoelectric actuators. The part was a solder-coated silicon block of 420 μm(D)×420 μm(W)×100 μm(H).

By combining the part rolling, pivot grasp, and regrasping methods, it is possible to control the orientation of a part. In order to demonstrate the usefulness of these dextrous micromanipulation techniques, a sample structure was made by manually attaching four micro-components with an ultra-violet (UV)-curing adhesive, Loctite 352. The size of the three base components was 75 μm×230 μm×400 μm, and the top small component was 80 μm×80 μm×430 μm. Parts started out flat on the platform stage, and the dextrous manipulation techniques mentioned above were used to reorient each component three-dimensionally. The adhesive was applied by dipping one edge of each component into an adhesive drop on the stage. UV light was applied to cure the adhesive for three minutes while each component was held on the structure by the tweezers.

The ortho-tweezers include two one DOF compliant fingers or arms perpendicular to each other. Strain gauges monitor the deflections, forces and part rolling angles. The tweezers can be dextrous and robust in manipulation of submillimeter-sized parts, even without closing a sensing loop. The tweezers by themselves can pick-and-place and roll parts. With help of a few fixtures on a three DOF cartesian stage, the tweezers can reliably pivot and regrasp a part by continually applying contact forces which greatly exceed micro-scale adhesion forces. By measuring contact generated moments on the part through strain gauges, it can be determined whether the part is aligned with a wall. For the demonstration of these techniques, a structure was made by bonding four micro-parts using UV-glue. With appropriate part pallets, this assembly process could be automated.

Figure 13:
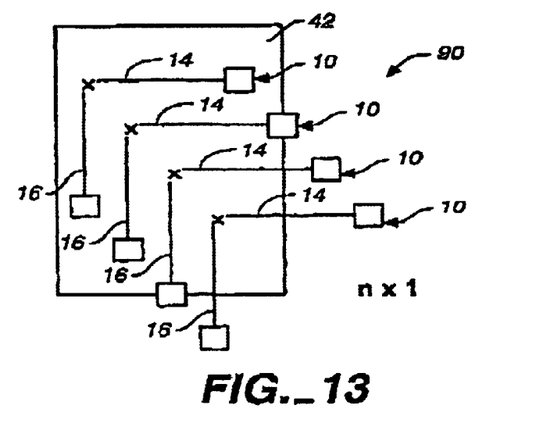
FIG. 13 is a schematic representations of an n×1 array of ortho-tweezers of the present invention.
Figure 14:
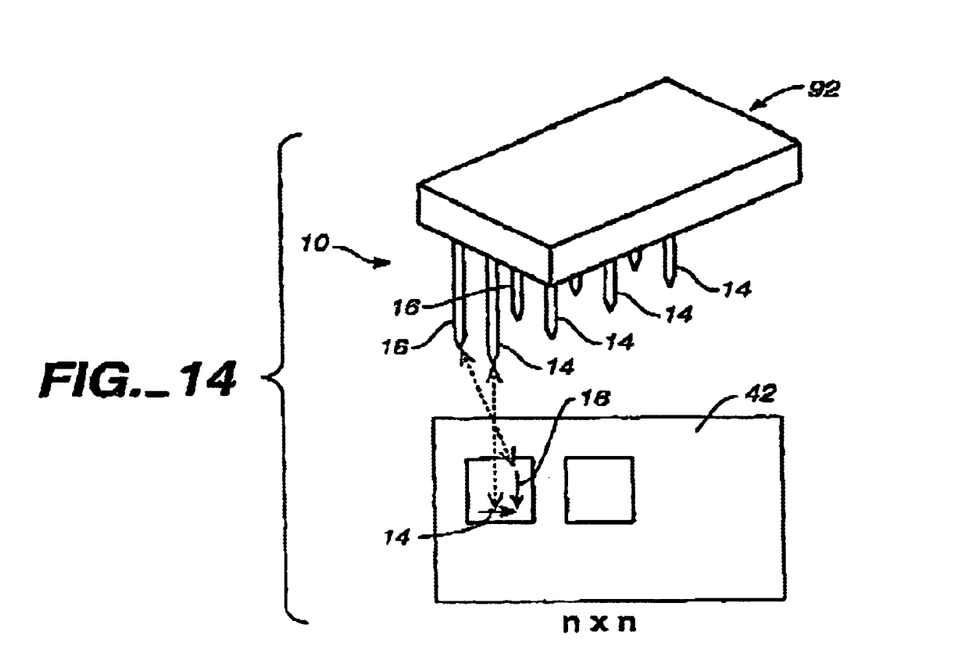
FIG. 14 is a schematic representation of an n×n array of ortho-tweezers of the present invention.

Also, by appropriately arranging a number of tweezers 10, it is possible to operate a parallel assembly with only one XYZ cartesian stage. For instance, as shown in FIG. 13, an array 90 of a plurality of tweezers 10 may be arranged adjacent the work platform 42 of the stage 44 to form an n×1 assembly for the manipulation of objects. Alternatively, as shown in FIG. 14, an array 92 of a plurality of tweezers 10 may be arranged above the work platform 42 to form an n×n assembly.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus to manipulate an object comprising: a pair of actuated compliant beams, mounted substantially perpendicular to each other, to move substantially in the same plane so as to move into contact with opposing surfaces of an object, to thereby grip and manipulate the object.

2. The apparatus of claim 1 wherein each compliant beam includes a piezoelectric actuator.

3. The apparatus of claim 2 wherein one end of the piezoelectric actuator is attached to a proximal end of a base member.

4. The apparatus of claim 3 wherein a tip member is attached to a distal end of the base member.

5. The apparatus of claim 4 wherein the tip member has an inclined face configured to engage the object to be manipulated.

6. The apparatus of claim 5 wherein the face of the tip member is inclined at angle of approximately 45 degrees.

7. The apparatus of claim 4 wherein a strain gauge is located at a face and back of each of the base member and the tip member.

8. The apparatus of claim 3 wherein the piezoelectric actuator drives a distal end of the base member.

9. The apparatus of claim 8 wherein the piezoelectric actuator drives the distal end of the base member through a point contact.

10. The apparatus of claim 1 further including a tip member joined to one end of each compliant beam.

11. The apparatus of claim 1 wherein each compliant beam includes an actuator selected from the group consisting of a thermal actuator, a motor-driven beam actuator, a polymer/thermal actuator, and a flexible circuit actuator.

12. The actuator of claim 1 further including at least one strain gauge to measure a deflection of a beam or a force applied by a beam.

13. The apparatus of claim 1 wherein one of the beams can only be driven along a first axis, while the other one of the beams can only be driven along a second axis that is perpendicular to the first axis.

14. The apparatus of claim 13 wherein each beam is fixed to a surface.

15. An apparatus to manipulate an object comprising:
a first arm that is actuated only along a first axis;
a second arm that is actuated only along a second axis that is substantially perpendicular to the first axis; and
the first and second arms movable substantially in the same plane and defining a space therebetween in which an object can be positioned such that the first arm can move into contact with a first surface of the object and the second arm can move into contact with a second surface of the object, whereby the first and second arms can grip and manipulate the object.

16. A system to manipulate an object comprising:
a first arm that is actuated only along a first axis;
a second arm that is actuated only along a second axis that is substantially perpendicular to the first axis; and
the first and second arms movable substantially in the same plane and defining a space therebetween in which an object can be positioned such that the first and second arms can move into contact with respective opposite surfaces of the object to grip and manipulate the object; and
an XYZ stage on which the object can be positioned.

17. A method of manipulating an object comprising:
bringing a first arm that is actuated only along a first axis into contact with one side of the object;
bringing a second arm that is actuated only along a second axis that is substantially perpendicular to the first axis into contact with another side of the object; and
actuating at least one of the first and second arms, the first and second arms being movable in substantially the same plane, to manipulate the object.

18. The method of claim 17 wherein the first and second arms are actuated to roll the object.

19. The method of claim 17 wherein the first and second arms are actuated to pick and place the object.

20. The method of claim 17 wherein the first and second arms are actuated to reorient the object perpendicular to a grasping wall.

21. The method of claim 17 wherein the first and second arms are actuated to align the object along a wall.

22. A method of manipulating a submillimeter-sized object comprising:
bringing a first actuated compliant beam into contact with one side of the object;
bringing a second actuated compliant beam that is mounted substantially perpendicular to the first beam into contact with another side of the object; and
operating the first and second beams so that they move in the same plane to manipulate the object.

23. A method of manipulating an object comprising:
contacting one side of the object with a first beam that is actuated only along a first axis;
contacting another side of the object with a second beam that is actuated only along a second axis that is perpendicular to the first axis;
positioning the object in a groove in a wall as the object is grasped by the first and second beams;
controlling the position of the wall and the first beam such that the wall and the first beam grasp the object, while the second beam is transferred to another side of the object;
controlling the position of the wall and the second beam such that the wall and the second beam grasp the object, while the first beam is transferred to yet another side of the object;
moving the wall away from the object; and
operating the first and second beams to rotate the object 90 degrees.

24. The method of claim 23 wherein the steps thereof are repeated to rotate the object 360° degrees.

25. An apparatus to manipulate an object comprising:
a first compliant arm that is actuated only along a first axis;
a second compliant arm that is actuated only along a second axis that is substantially perpendicular to the first axis; and
the first and second arms capable of being selectively brought into contact with respective opposite surfaces of an object, with the motion of the first and second arms being substantially coplanar, to thereby grip and manipulate the object.

26. The apparatus of claim 1 wherein the angle between the opposing surfaces is less than twice the friction angle of the opposing surfaces.

* * * * *

UNITED STATES PATENT AND TRADEMARK OFFICE
CERTIFICATE OF CORRECTION

PATENT NO.    : 6,798,120 B1  
DATED         : September 28, 2004  
INVENTOR(S)   : Ronald S. Fearing and Eijii Shimada

It is certified that error appears in the above-identified patent and that said Letters Patent is hereby corrected as shown below:

Drawings,
Sheet 1, Fig. 2, is replaced by the attached Replacement Sheet 1. Sheet 5, Figs. 7A, 7B, 7C, are replaced by the attached Replacement Sheet 5. In Fig. 2, reference numbers 14, 16, 18 and 20 have been deleted, and lead lines have been added for Arm 1 and Arm 2. In Figs. 7A-7C, reference numbers 14 and 16 have been replaced by reference numbers 14a and 16a, and reference numbers 14b and 16b have been added.

*FIG._2*

Sheet 1, Fig. 2, is replaced by the attached Replacement Sheet 1. Sheet 5, Figs. 7A, 7B, 7C, are replaced by the attached Replacement Sheet 5. In Fig. 2, reference numbers 14, 16, 18 and 20 have been deleted, and lead lines have been added for Arm 1 and Arm 2. In Figs. 7A-7C, reference numbers 14 and 16 have been replaced by reference numbers 14a and 16a, and reference numbers 14b and 16b have been added.

*FIG._7A*     *FIG._7B*     *FIG._7C*

UNITED STATES PATENT AND TRADEMARK OFFICE
CERTIFICATE OF CORRECTION

Figure 11:
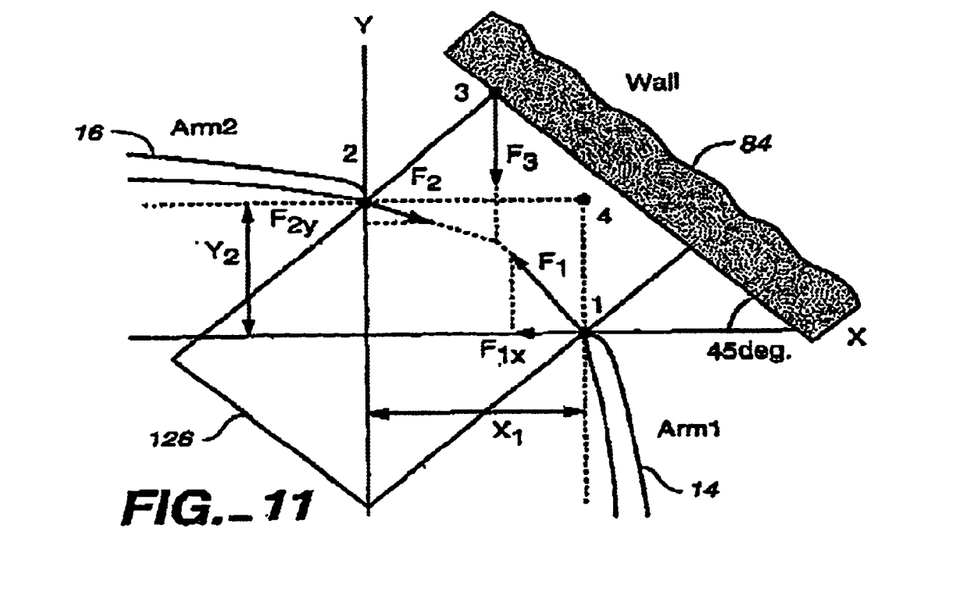
FIG. 11 is a schematic view illustrating an alignment technique using the apparatus of the present invention.
Figure 12A:
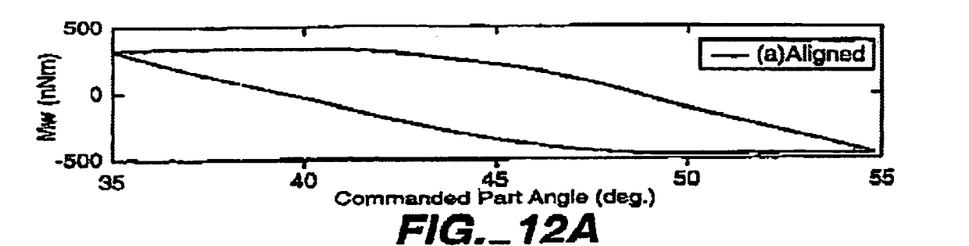
Figure 12B:
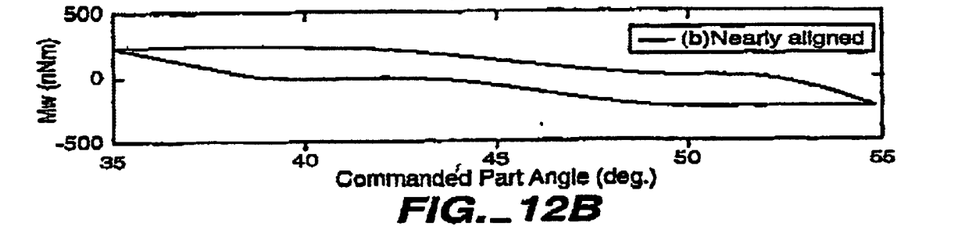
Figure 12C:
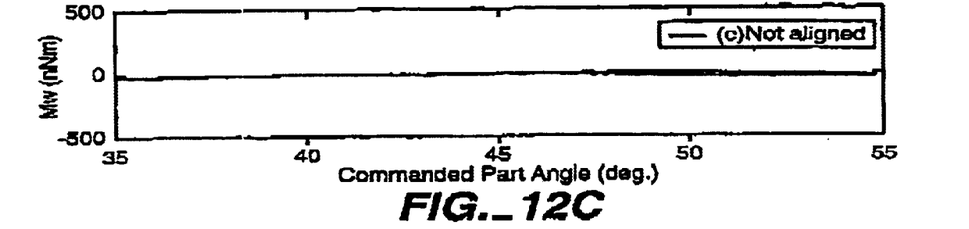

PATENT NO. : 6,798,120 B1
DATED : September 28, 2004
INVENTOR(S) : Ronald S. Fearing and Eijii Shimada It is certified that error appears in the above-identified patent and that said Letters Patent is hereby corrected as shown below:

<u>Column 3,</u>
After line 45, between the description of FIGS. 11 and 13, add the following paragraph:
-- FIGS. 12A-12C are graphical representations of a moment at a wall in aligning an object using the technique illustrated in FIG. 11. --

Signed and Sealed this

Fifth Day of April, 2005

JON W. DUDAS
*Director of the United States Patent and Trademark Office*